United States Patent [19]

Murakosi et al.

[11] 4,078,198

[45] Mar. 7, 1978

[54] APPARATUS FOR REPEATING THE SAME PROCESS

[75] Inventors: Takeo Murakosi; Toshiyuki Tanno, both of Katsuta, Japan

[73] Assignee: Hitachi, Ltd., Japan

[21] Appl. No.: 635,083

[22] Filed: Nov. 25, 1975

[30] Foreign Application Priority Data

Nov. 27, 1974 Japan .............................. 49-135511

[51] Int. Cl.² ................................................ G05G 5/00
[52] U.S. Cl. ................................... 318/627; 318/282; 318/663; 356/89
[58] Field of Search ............... 318/294, 295, 281, 282, 318/627, 663; 356/89, 97, 96

[56] References Cited

U.S. PATENT DOCUMENTS

| | | | |
|---|---|---|---|
| 3,378,739 | 4/1968 | Livengood et al. | 318/678 X |
| 3,532,957 | 10/1970 | Mettert | 318/627 |
| 3,789,283 | 1/1974 | Kabat | 318/295 |
| 3,890,553 | 6/1975 | Diamond | 318/678 |
| 3,939,388 | 2/1976 | Abe et al. | 318/678 X |

*Primary Examiner*—B. Dobeck
*Attorney, Agent, or Firm*—Craig & Antonelli

[57] ABSTRACT

Two extreme points of a range within which a movable body is reciprocated, are set by two position setting means provided with variable resistors. The voltage at the sliding contact of a variable resistor coupled to the movable body is always compared with the voltages preset by the respective position setting means. The two signals produced as a result of the two comparisons are applied to a control circuit, the output of which causes the motor to drive the movable body to rotate in the forward or reverse direction in accordance with the two signals. Thus, the movable body automatically performs a reciprocal motion between the two preset extremes.

8 Claims, 9 Drawing Figures

FIG. 7
|  | (1) | (2) | (3) | (4) | (5) |
|---|---|---|---|---|---|
| A | 1 | 0 | 1 | 0 | 1 |
| B | 0 | 1 | 0 | 1 | 0 |
| C | 1 | 1 | 0 | 0 | 1 |
| D | 0 | 0 | 1 | 1 | 0 |
FLIP-FLOP OUTPUTS
"1": 5V
"0": 0V
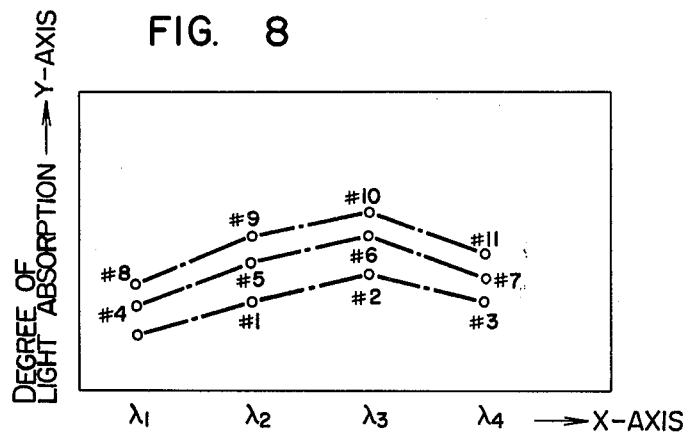
FIG. 8
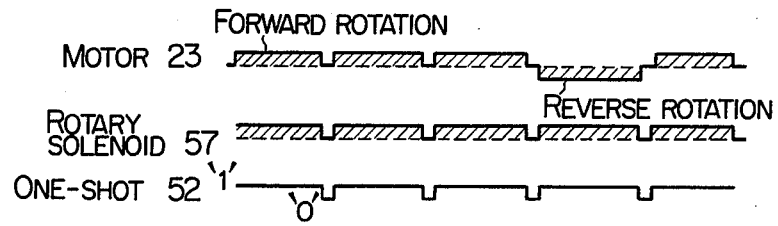
FIG. 9

APPARATUS FOR REPEATING THE SAME PROCESS

BACKGROUND OF THE INVENTION

1. Field of the Invention

The present invention relates to an apparatus for repeating the same process and more particularly to an apparatus for producing an automatic reciprocating motion of a movable body between two arbitrarily set positions.

2. Description of the Prior Art

The conventional apparatus of this kind usually uses an electric motor for moving a movable body. In order to repeat the reciprocal motion of the movable body, the polarity of the exciting coil of the motor is changed over by means of a change-over switch so as to rotate the motor in the forward and reverse direction.

On the other hand, the setting circuit which sets the two extreme points between which the movable body is automatically reciprocated, consists of two variable resistors for setting the two extremes and another variable resistor operated in gang with the motor.

As the movable body shifts, the voltage at the sliding contact of the variable resistor coupled to the motor varies continuously. This voltage is alternately compared with the voltages at the sliding contacts of the variable resistors for setting the extreme positions.

The two voltages at the sliding contacts of the position setting variable resistors are changed over by a change-over switch. It is when the two compared voltages are equal to each other, that is, the movable body reaches one of the extreme positions, that the change-over switch is actuated.

Moreover, whenever the change-over switch is actuated, the polarities of a power source connected with the two variable resistors for position setting must be switched over by another change-over switch operated in gang with the above change-over switch.

Usually, relays are used as such change-over switches as mentioned above. And these relays are controlled by a control circuit including a detecting circuit which checks the coincidence of the two compared voltages.

However, such a conventional apparatus as described above has the following drawbacks. First, in the conventional apparatus, there are used a plurality of change-over switches such as relays for changing over the polarities of the voltages at the sliding contacts of the variable resistors for position setting and the polarities of the power source connected with the variable resistors. (Hereinafter, only relays are referred to because relays are used as such change-over switches practically.) The use of the relays which are never free from the deterioration of contacts, will therefore shorten the life of the apparatus as a whole and also result in the degradation in reliability due to the malfunction of the worn-out contacts. In addition to this, the material for the contacts of the relays must be carefully selected since the current flowing through the sliding contacts of the variable resistors is interrupted by the contacts of the relays.

Secondly, at the start of operation, since the motor is rotated in the direction determined by the initial condition of the above mentioned control circuit, the movable body must be previously located between the two extreme positions. This lowers the efficiency of the operation of the apparatus.

Thirdly, since the change in the voltage at the sliding contact of the variable resistor coupled to the motor is not characterized by the direction of the movement of the movable body, the voltage does not represent the position of the movable body. Hence, even if the voltage is taken out and applied to the input terminal of the X-axis of an X-Y recorder, the recording in accordance with the position of the movable body cannot be performed.

SUMMARY OF THE INVENTION

One object of the present invention, which has been made to eliminate such drawbacks of the conventional apparatus as mentioned above, is to provide an apparatus for repeating the same process, having a high reliability.

Another object of the present invention is to provide an apparatus for repeating the same process, having a high operation efficiency.

Yet another object of the present invention is to provide an apparatus for repeating the same process, adapted to be connected for recording with an X-Y recorder.

These object of the present invention can be attained by respectively comparing through two comparators the two voltages determined in accordance with the positions of the sliding contacts of the variable resistors for setting the two extreme positions of the range to be repeatedly covered, with the voltage at the sliding contact of the variable resistor coupled to the moving body; by applying the respective outputs of the comparators to logic circuits so as to change the outputs of the logic circuits; and by reciprocating the movable body within the predetermined range through the control of the moving body driving means by the outputs of the logic circuits.

The invention is described in more detail hereinafter with reference to the accompanying drawings wherein like reference numerals refer to the same parts throughout the drawings.

BRIEF DESCRIPTION OF THE DRAWINGS

FIGS. 7, 8 and 9 are diagrams useful for explaining the operation of the circuit shown in FIG. 5.

DESCRIPTION OF THE PREFERRED EMBODIMENT

Figure 1:
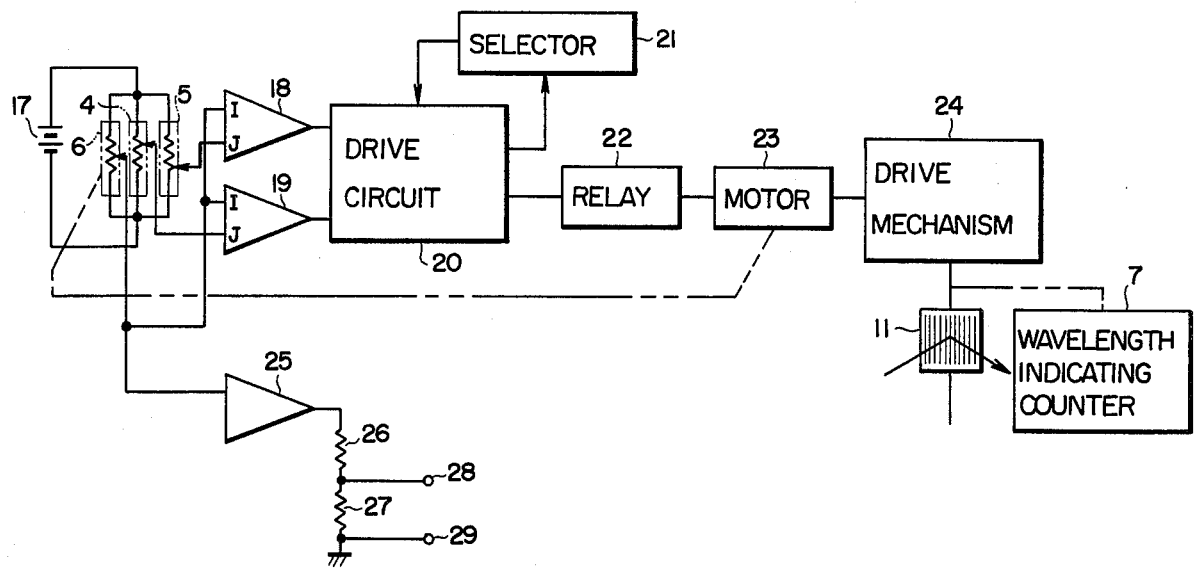
FIG. 1 is a general block diagram of a spectrophotometer using an apparatus for repeating the same process, according to the present invention.
Figure 2:
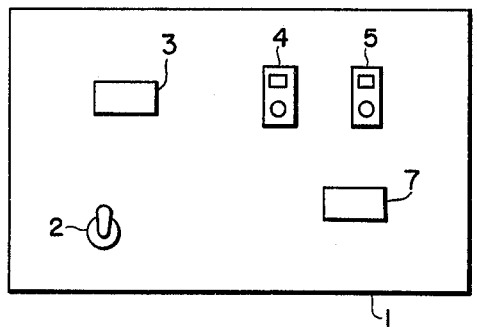
FIGS. 2, 3 and 4 respectively show the front panel, the block diagram of the mechanical system and the electric circuit of the spectrophotometer shown in FIG. 1.

FIGS. 1, 2, 3, and 4 show an embodiment of the present invention, in which the apparatus, according to the present invention, for producing a reciprocating motion is applied to a spectrophotometer. FIG. 1, FIG. 2, FIG. 3 and FIG. 4 respectively show a general block diagram, the front panel, the system of mechanism, and the electrical circuit of the spectrophotometer.

In the drawings, a spectrophotometer 1 has a front panel (FIG. 2) furnished with a power switch 2; a button switch 3 of the locked type which starts or stops the reciprocating motion and which is closed when depressed; variable resistors 4 and 5 each of which has a dial graduated in wavelengths, to set a range of wavelengths repeatedly covered; and a counter 7 for representing wavelenth.

Figure 3:
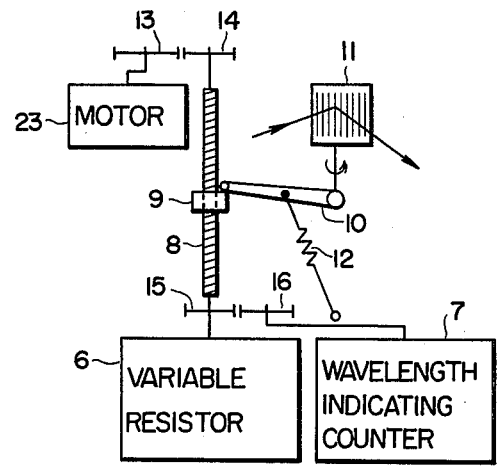

A drive mechanism 24 shown in FIG. 1 has a constitution as shown in FIG. 3. A screw 8 for shifting wavelength is rotated via gears 13 and 14 by an electric motor 23. A nut 9 moves up or down in accordance with the direction of the rotation of the screw 8. As the screw 8 rotates, the sliding contact of a variable resistor 6 connected with the screw 8 and the counter 7 for representing wavelengths connected via gears 15 and 16 with the screw 8 are driven. The upward and downward movement of the nut 9 is converted to rotary motion by means of a lever arm 10 so that a diffraction grating 11 engaged with the arm 10 is rotated. Accordingly, the angle of incident light upon the grating 11 varies and the grating 11 emits a monochromatic light having a wavelength which depends on the angle of incidence. A spring 12 serves to urge the arm 10 against the nut 9 so as to cause the arm 10 to follow the downward movement of the nut smoothly.

Figure 4:
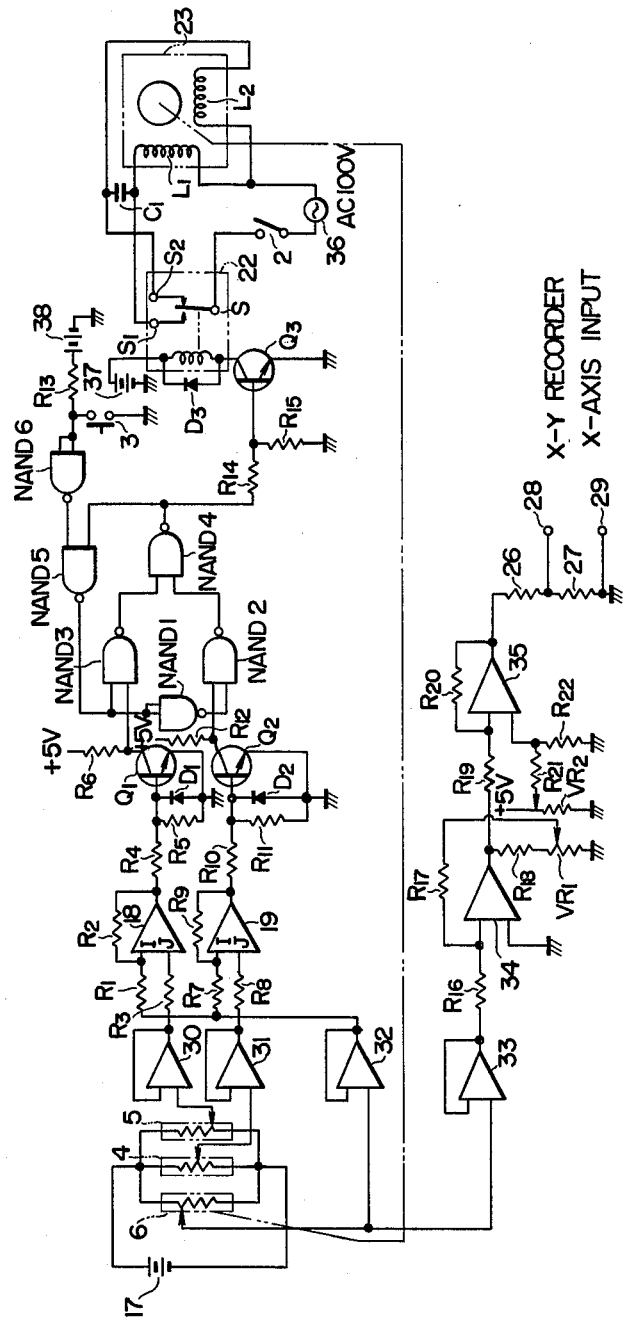

The electric system of the spectrophotometer to which the present apparatus for producing a reciprocating motion is applied, the fixed terminals of each of the variable resistors 4 and 5 for setting the range of wavelengths covered and the fixed terminals of the variable resistor 6 coupled to the motor 23, are connected with a dc power source 17. Comparators 18 and 19 serve respectively to compare the voltages set at the sliding or movable contacts of the variable resistors 4 and 5, with the voltage at the sliding contact of the variable resistor 6 connected with the screw 8. Each of the comparators 18 and 19 delivers a positive or a negative voltage accordingly as the potential at the input terminal I is higher or lower than the potential at the input terminal J respectively. A drive circuit 20 in FIG. 1 may be composed of transistors $Q_1$ and $Q_2$, resistors $R_1 - R_{15}$, diodes $D_1$ and $D_2$, and NAND elements NAND 4, NAND 5 and NAND 6, as shown in FIG. 4 for example. Also, as shown in FIG. 4 for example, a selector 21 in FIG. 1 may be composed of NAND elements NAND 1, NAND 2 and NAND 3 and serves to select one of the outputs of the comparators 18 and 19. A relay 22 is connected with a source 37 and driven by a transistor $Q_3$. When the contacts S and $S_2$ of the relay 22 are closed, a capacitor $C_1$ for phase shifting is connected in series with the winding $L_1$ of the motor 23, so that the motor 23 causes the grating 11 to rotate in such a direction as to shift the wavelength from a long one to a short one (hereinafter referred to as the forward direction). On the other hand, if the contacts S and $S_1$ of the relay 22 are in contact with each other, the capacitor $C_1$ is connected in series with the winding $L_2$ of the motor 23, so that the motor 23 drives the grating 11 to rotate in such a direction as to shift the wavelength from a short one to a long one (hereinafter referred to as the reverse direction). An amplifier 25 shown in FIG. 1 serves to apply the voltage at the sliding contact of the variable resistor 6 to the X-axis input terminals 28 and 29 of an X-Y recorder, through voltage dividing resistors 26 and 27. The amplifier 25 may be composed of a buffer amplifier 33 and amplifiers 34 and 35, as shown in FIG. 4 for example. Amplifiers 30, 31 and 32 are also buffer amplifiers. Each of the buffer amplifiers 30, 31, 32 and 33 has an amplification of 1 and functions as a mere impedance converting means. The motor 23 is powered by an ac source 36.

Now, the operation of the spectrophotometer to which an apparatus for producing a reciprocating motion according to the present invention, will be described with the aid of FIG. 4. In the following description it is assumed that the variable resistor 4 defines the longest wavelength of the wavelength range to be repeatedly covered and that the variable resistor 5 gives the shortest one of that range.

First, the case will be enlarged upon where the switch 3 is depressed and then the switch 2 is turned on, when the wavelength of the spectrophotometer, i.e. the wavelength determined by the position of the sliding contact of the variable resistor 6, is longer than the wavelength set by the variable resistor 4. In such a case, the voltage at the sliding contact of the variable resistor 6 is higher than those set at the sliding contacts of the variable resistors 4 and 5. Accordingly, in each of the comparators 18 and 19, the potential at the input terminal I is higher than that at the input terminal J so that the output of each of the comparators 18 and 19 is a positive voltage. Consequently, the transistors $Q_1$ and $Q_2$ are turned on through resistors $R_4$ and $R_{10}$, and the collectors of the transistors $Q_1$ and $Q_2$ deliver "0" (0V). Thus, the outputs of NAND 2 and NAND 3 become "1" (5V), and the output of NAND 4 becomes "0" (0V), so that the transistor $Q_3$ is cut off and the relay 22 remains deenergized. Hence, the contacts S and $S_1$ are closed to rotate the motor 23 forward so that the nut 9 shifts along the worm gear 8 in such a direction as to rotate the grating 11 in the forward direction as stated above. The counter 7 for displaying wavelengths, in gang with the warm gear 8, displays the wavelength of the monochromatic light diffracted from the grating 11 and simultaneously the sliding contact of the variable resistor 6 moves to lower the voltage at this contact gradually. In this way, the wavelength of the monochromatic light from the grating 11, i.e. the wavelength of the spectrophotometer 1, becomes shorter. If during this process the voltage at the sliding contact of the variable resistor 6 becomes lower than that at the sliding contact of the variable resistor 4 (i.e. preset voltage), the comparator 19 delivers a negative voltage (−10V) so that the transistor $Q_2$ is cut off with its collector voltage changed over to "1" (+5V). On the other hand, the output of NAND 4 is "0" and the output of NAND 1 remains "0." Accordingly, even when the transistor $Q_2$ delivers "1," the output of NAND 2 and therefore the output of NAND 4 remain unchanged to cause the motor 23 to continue to rotate in the forward direction. When the motor continues to rotate forward until the voltage at the sliding contact of the variable resistor 6 becomes lower than the voltage preset by the variable resistor 5, the comparator 18 also delivers a negative voltage (−10V) so that the transistor $Q_1$ is cut off with its collector output changed over to "1" (+5V). In this case, the inputs of NAND 3 are all "1" and it delivers "0" so that NAND 4 delivers "1." Thus, the transistor $Q_3$ is turned on and the relay 22 is in turn actuated to close the contacts S and $S_1$ so that the capacitor $C_1$ and the winding $L_2$ of the motor 23 are connected in series with each other to change the direction of the rotation of the motor 23 into the reverse one. Accordingly, by means of the drive mechanism 24, the wavelength of the spectrophotometer gradually increases. In this way, the wavelength of the spectrophotometer becomes longer by degrees than the shortest wavelength preset by the variable resistor 5 and when the voltage at the sliding contact of the variable resistor 6 exceeds the voltage preset by the variable resistor 4, the output of the comparator 19 is inverted again to the positive voltage (+10V). Then, the transistor $Q_2$ is turned on and the collector output of the transistor $Q_2$ is changed to "0" (0V). On the other hand, the outputs of NAND 4 and NAND 6 are both "1" (since the switch 3 is closed, the input of NAND 6 connected through a resistor $R_{13}$ with a power source 38 is grounded, i.e. "0") and the output of NAND 5 is "0" so that the output of NAND 1 is "1." So, the output of NAND 2 is determined by the output of the transistor $Q_2$. As described above, since the output of the transistor $Q_2$ was "0," the output of NAND 2 is changed over to "1." also, since the output of NAND 5 is "0," the output of NAND 3 is "1" independent of the output of the transistor $Q_1$. Accordingly, the inputs of NAND 4 are both "1" and its output is changed to "0." Consequently, the transistor $Q_3$ is turned off to reverse the rotation of the motor 23 into the forward direction again through the operation of the relay 22. Thus, the wavelength of the spectrophotometer begins to change from its longest one preset by the variable resistor 4 toward the shortest one preset by the variable resistor 5.

In this way, even if the wavelength of the spectrophotometer is above the predetermined range of wavelengths reciprocatively covered, at the start of operation, the reciprocating process within the predetermined range can be automatically performed.

Next, the operation of the apparatus for performing a reciprocating process according to the present invention will be described in the case where the button switch 3 is depressed and then the power switch 2 is turned on, when the wavelength of the spectrophotometer has been within the range of wavelengths between the two extremes preset by the variable resistors 4 and 5. In this case, since the potential at the input terminal I of the comparator 18 is higher than that at the input terminal J of the same comparator 18, the output thereof is a positive voltage so that the transistor $Q_1$ is turned on with its collector output reduced to "0" (0V). As to the comparator 19, on the other hand, the potential at the input terminal I is lower than that at the input terminal J so that the output of the comparator 19 is negative, with the collector of the transistor $Q_2$ kept at "1" (5V). At the time of turning-on of the power source, the output of NAND 4 is "0" since the ouput terminal thereof if grounded via resistors $R_{14}$ and $R_{15}$. Hence, the outputs of NAND 5 and NAND 1 are respectively "1" and "0." At the start of operation, therefore, the outputs of NAND 2 and NAND 3 are both "1" while the output of NAND 4 is "0," and this condition is maintained so far as the output of the transistor $Q_1$ remains unchanged. Accordingly, the transistor $Q_3$ remains cut off and, as described above, the motor 23 starts the forward rotation. The following operation is the same as described above and the reciprocating process can be automatically performed within the predetermined range.

Finally, the operation of the present apparatus for performing a reciprocating process will be described in the case where the button switch 3 and the power switch 2 are turned on when the wavelength of the spectrophotometer is below the predetermined range of wavelengths, i.e. shorter than the shortest wavelength of the range preset by the variable resistor 5. In this case, since the potential at the input terminal I is lower than that at the input terminal J in each of the comparators 18 and 19, the collector outputs of the transistors $Q_1$ and $Q_2$ are both "1," as seen from the foregoing description. Since the input and the ouput of NAND 1 are opposite to each other, that is, the input is "1" and the output is "0∞ or the input is "0" and the output is "1," then one of the outputs of NAND 2 and NAND 3 becomes "0" to make the output of NAND 4 "1." Accordingly, the transistor $Q_3$ is turned on and the contacts S and $S_1$ of the relay 22 are closed so that the motor 23 starts the reverse rotation. Consequently, the wavelength of the spectrophotometer gradually increases with the accompanying increase in the voltage at the sliding contact of the variable resistor 6. Even when the voltage at the sliding contact of the variable resistor 6 exceeds the voltage preset by the variable resistor 5 so that the output of the comparator 18 is inverted to the positive voltage to reduce the collector output of the transistor $Q_1$ to "0," the output of NAND 3 remains "1" since the output of NAND 5 is "0" (since the switch 3 is closed, the output of NAND 6 is "1"). Hence, the output of NAND 4 remains unchanged and the motor 23 continues to rotate in the reverse direction. When the wavelength of the spectrophotometer increases further and when the voltage at the sliding contact of the variable resistor 6 exceeds the voltage preset by the variable resistor 4, the output of the comparator 19 is also inverted to a positive voltage so that the output of the transistor $Q_2$ is changed to "0." Accordingly, the output of NAND 2 becomes "1," the output of NAND 4 is inverted to "0," and the transistor $Q_3$ is cut off so that the contacts S and $S_1$ of the relay 22 are closed to cause the motor 23 to start the forward rotation. Simultaneously, the outputs of NAND 5 and NAND 1 are respectively "1" and "0" and the reciprocating process within the predetermined range is performed as in the case where the wavelength of the spectrophotometer at the start of operation is above the predetermined wavelength range to be repeatedly covered.

As described above, in the embodiment shown in FIGS. 1 to 4 in which the apparatus for performing a reciprocating process according to the present invention is applied to a spectrophotometer, the reciprocating process within the predetermined range can be automatically performed whatever value the wavelength of the spectrophotometer (i.e. the position of the nut 9 or the position of the sliding contact of the variable resistor 6) may assume.

Moreover, it is apparent from the foregoing lines that the voltage at the sliding contact of the variable resistor 6 makes a 1-to-1 correspondence with the angular position of the grating 11, i.e. the wavelength of the spectrophotometer, and if this voltage, after being passed through the buffer amplifier 33 and the amplifiers 34 and 35, is divided by the resistors 26 and 27 are applied to the X-axis input terminals 28 and 29 of an X-Y recorder, the X-axis of the recorder can indicate the positions corresponding to the wavelengths of the spectrophotometer, i.e. the wavelengths displayed on the wavelength display counter 7. Variable resistors $VR_1$ and $VR_2$ shown in FIG. 4 serve to control the voltage applied to the X-axis input terminal of the X-Y recorder.

Figure 6:
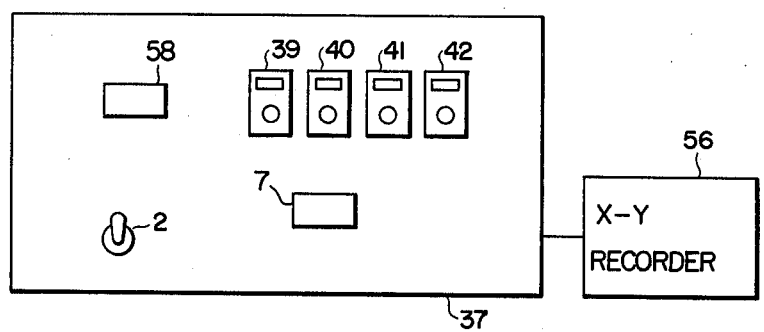
FIG. 6 shows the front panel of the spectrophotometer of FIG. 5.
Figure 5:
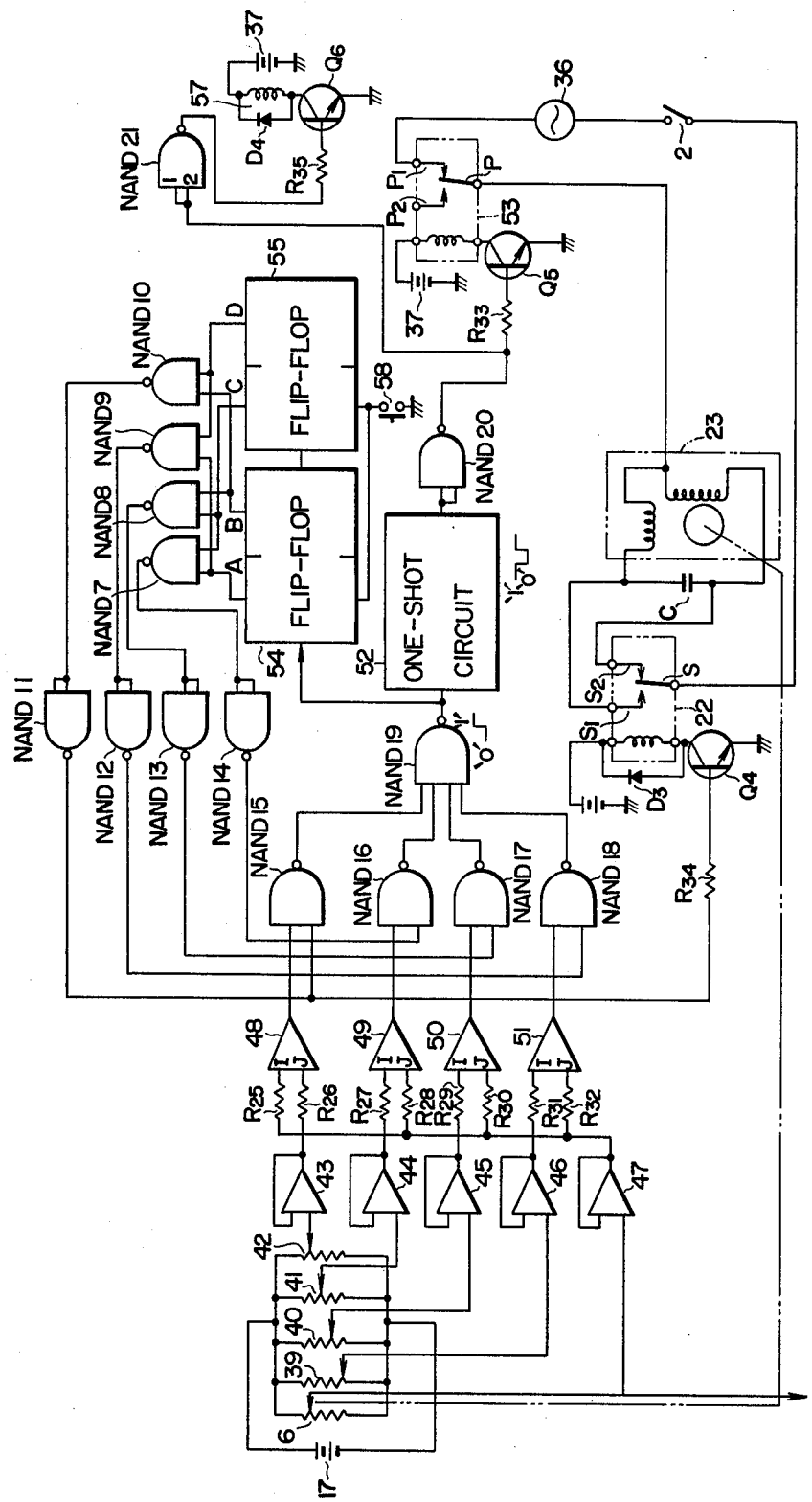
FIG. 5 is the electric circuit of a spectrophotometer to which another embodiment of the present invention is applied.

With the aid of FIGS. 5 to 9, the case will be described below where the present apparatus for performing a reciprocating process is applied to a spectrophotometer of dot recording type which measures the degree of light absorption by specimen and makes repeated plotting with respect to four wavelengths $\lambda_1$, $\lambda_2$, $\lambda_3$ and $\lambda_4$. FIGS. 5 and 6 show the electrical circuit and the front panel, of such a spectrophotometer, respectively and FIGS. 7, 8 and 9 illustrate the operation of the spectrophotometer. The mechanical drive system in this example is the same as that shown in FIG. 3 and the parts or elements in FIGS. 5 and 6 equivalent to those in FIGS. 1 to 4 are indicated by the same reference symbols.

As shown in FIG. 5, the sliding contacts of variable resistors 39, 40, 41 and 42 for presetting the wavelengths $\lambda_1$, $\lambda_2$, $\lambda_3$ and $\lambda_4$ at which the degrees of light absorption by the specimen are to be measured and plotted, and the sliding contact of the variable resistor 6 coupled for wavelength shift to the motor 23 are connected via buffer amplifiers 43, 44, 45, 46 and 47 with the inputs of comparators 48, 49, 50 and 51. A one-shot circuit 52 operates simultaneously with the plotting operation of the X-Y recorder, signals a relay 53 for temporarily stopping the motor 23 during the plotting operation and energizes a rotary solenoid 57 for shifting up and down the writing pen of the X-Y recorder 56 (FIG. 6). NAND elements NAND 7, 8, 9 and 10 constitute a matrix circuit. A reset switch 58, when turned on (depressed), resets flip-flops 54 and 55 in such a manner that their outputs are as shown in the column (1) of the table in FIG. 7.

The front panel of the spectrophotometer according to the present invention, shown in FIG. 6, is provided with a power switch 2, a reset switch 58, a wavelength display counter 7 and set wavelength display sections of the variable resistors 39, 40, 41 and 42 for setting the wavelengths at which the degrees of light absorption by the specimen are measured.

The operation of the above-described spectrophotometer of dot recording type will be explained below. First, four wavelengths $\lambda_1$, $\lambda_2$, $\lambda_3$ and $\lambda_4$ are set by the variable resistors 39, 40, 41 and 42 such that $\lambda_4 < \lambda_3 < \lambda_2 < \lambda_1$. The power switch 2 is turned on and the reset switch 58 is depressed, while the sliding contact of the variable resistor 6 coupled for wavelength shifting to the motor 23 is at the position corresponding to the wavelength $\lambda_1$. When the reset switch 58 is depressed, the outputs A and B of the flip-flop 54 become "1" and "0" respectively and the outputs C and B of the flip-flop 55 become "1" and "0" respectively, as shown in the column (1) of the table in FIG. 7. Accordingly, in the matrix circuit, the outputs of NAND 8, 9 and 10 are all "1" (5V) while the outputs of NAND 7 is "0" (0V). On the other hand, each of the comparators 49, 50 and 51 delivers an output "0" since the potential at its input terminal I is lower than that at its input terminal J while the output of the comparator 48 is "1" since the potential is higher at the input terminal I than at the input terminal J. Accordingly, the outputs of NAND 11, 12, 13 and 14 are respectively "0," "0," "0" and "1," that is, the inversions of the outputs of NAND 10, 9, 8 and 7. Therefore, the outputs of NAND 15 - 18 are all "1" so that the output of NAND 19 is "0." Thus, the one-shot circuit 52 is not switched over and continues to deliver an output "1" (5V) to cause NAND 20 to deliver an output "0" (0V). A transistor $Q_5$ is cut off, a relay 53 remains deenergized with its contacts P and $P_1$ closed, and the motor 23 is rotated by an ac power source 36. The direction of the rotation of the motor 23 in this case is forward since the output of NAND 11 is "0" to turn off the transistor $Q_4$ and the contact S and $S_2$ of the relay 22 are closed. Consequently, the wavelength of the spectrophotometer decreases gradually. Since the output of NAND 21 is "1," the transistors $Q_6$ is turned on so that current flows through the rotary solenoid 57 to keep the pen of the X-Y recorder up (in non-recording condition).

In this way, the wavelength shifting is peformed from $\lambda_1$ preset by the variable resistor 42 toward shorter wavelengths. When the wavelength $\lambda_2$ preset by the variable resistor 41 is approached and then the potential at the input terminal I of the comparator 49 becomes higher than that at the input terminal J, the output of the comparator 49 is changed to "1" (5V). Accordingly, the output of NAND 16 is "0" to change the output of NAND 19 to "1." In response to the change of the output of NAND 19 from "0" to "1," the one-shot circuit 52 is actuated to change its output from "1" (5V) to "0" (0V) only for a fixed time T seconds. This time T is required for stopping the motor 23 and shifting the pen down for recording. During the period of T seconds, therefore, the output of NAND 20 is "1" (5V) and the transistor $Q_5$ is conducting, so that the rotation of the motor 23 is stopped only for the period of T seconds through the operation of the relay 53. Also, during this period of T seconds, the output of NAND 21 is "0," so that a transistor $Q_6$ is cut off and the rotary solenoid 57 of the recorder is deenergized to shift down the pen. Thus, the dot representing the degree of light absorption with respect to $\lambda_2$ is plotted, as indicated by point #1 in FIG. 8. At the same time, the output of NAND 19 is changed from "0" to "1" so that the outputs A and B of the flip-flop 54 are switched over respectively to "0" and "1," the outputs of the flip-flops 54 and 55 becoming as shown in the column (2) of the FIG. 7. Accordingly, in the matrix circuit, the outputs of NAND 7, 9 and 10 are all "1" while the output of NAND 8 is "0," so that the outputs of NAND 11, 12 and 14 are all "0." The output of the comparator 50 is also "0" and the outputs of NAND 15 to 18 are all "1." Consequently, NAND 19 resumes delivery of an output "0." Now, when the period of time T set by the one-shot circuit 52 has passed, the recording operation of the X-Y recorder is finished, the writing pen is lifted up and the motor 23 resumes rotation to start the wavelength shifting toward shorter wavelengths.

When the wavelength $\lambda_3$ preset by the variable resistor 40 is approached as the wavelength of the spectrometer becomes shorter and then the potential at the input terminal I of the comparator 50 becomes higher than that at the other input terminal J, the output of the comparator 50 is changed to "1." On the other hand, since the output of NAND 13 is "1," the output of NAND 17 is "0" so that the output of NAND 19 is changed from "0" to "1." In the like manner as mentioned above, therefore, the one-shot circuit 52 is actuated to temporarily stop the rotation of the motor 23 and to perform the dot plotting of the degree of light absorption with respect to $\lambda_3$ by the X-Y recorder, as indicated by point #2 in FIG. 8, and simultaneously the outputs of the flip-flops 54 and 55 are switched over as shown in the column (3) of FIG. 7. Accordingly, of all the outputs of the matrix, the output of NAND 9 alone is "0" and the output of NAND 19 recovers "0." During the above process, the state of the flip-flop 55 is inverted since the output B of the flip-flop 54 is changed from "1" to "0." Under this condition, when the recording has been finished in the same manner as above, the motor 23 resumes its forward rotation for shifting the wavelength toward shorter ones.

When the wavelength $\lambda_4$ preset by the variable resistor 39 is approached as the wavelength of the spectrometer further decreases and then the voltage at the sliding contact of the variable resistor 6 becomes lower than the voltage set by the variable resistor 39, the output of the comparator 51 becomes "1." Since the output of NAND 12 is also "1," the output of NAND 18 is "0" so that the output of NAND 19 is changed from "0" to "1." As a result, the dot recording with respect to $\lambda_4$ (point #3 in FIG. 8) is performed in the same manner as above. In this case, the change of the output of NAND 19 from "0" to "1" sets the states of the flip-flops 54 and 55 as shown in the column (4) of FIG. 7. In the matrix circuit, only the output of NAND 10 becomes "0" so that the output of NAND 11 becomes "1" while the outputs of NAND 12, 13 and 14 are all "0." Here, if the output of NAND 11 becomes "1," the transistor $Q_4$ is turned on to actuate the relay 22 and the contacts S and $S_1$ of the relay 22 are then closed so that the motor 23 is switched over from forward to reverse rotation. Since the outputs of the comparator 48 and NAND 12, 13 and 14 are all "0," the outputs of NAND 15 to 18 are all "1" so that the output of NAND 19 becomes "0." Under this condition, when the one-shot circuit 52 is reset to "1" after a period of T seconds, the motor 23 starts its reverse rotation through the operations of the transistor $Q_5$ and the relay 53 and simultaneously the pen of the X-Y recorder is lifted up.

Thus, after the dot recording with respect to the wavelength $\lambda_4$ set by the variable resistor 39 has been performed, the motor 23 is rotated in the reverse direction so that the voltage at the sliding contact of the variable resistor 6 coupled to the motor 23 gradually rises. When the voltage at the sliding contact of the variable resistor 6 exceeds the voltages set by the variable resistors 40 and 41, the outputs of the comparators 50 and 49 are changed from "1" to "0." On the other hand, since the outputs of NAND 13 and 14 are both "0," the outputs of NAND 17 and 16 remain unchanged as "1" so that the output of NAND 19 also remains unchanged. Therefore, the motor 23 continues its reverse rotation and the states of the flip-flops 54 and 55 still remain unchanged, as shown in the column (4) of FIG. 7.

When the wavelength of the spectrophotometer approaches the wavelength $\lambda_1$ set by the variable resistor 42 as a result of the motor 23 continuing its reverse rotation and then the potential at the input terminal I of the comparator 48 becomes higher than the potential at the other input terminal J, the output of the comparator 48 is changed from "0" to "1." Since the output of NAND 11 is then "1," the output of NAND 15 is changed to "0" and therefore the output of NAND 19 is switched over to "1." Consequently, the one-shot circuit 52 is actuated and the rotation of the motor 23 is temporarily stopped to perform the dot plotting of the degree of light absorption with respect to $\lambda_1$ (point #4 in FIG. 8), in the same manner as explained above. Simultaneous with this, the change of the output of NAND 19 from "0" to "1" resets the states of the flip-flops 54 and 55 to those as shown in the column (5) of FIG. 7, i.e. to the initial conditions equivalent to the column (1) of FIG. 7. As a result, in the matrix circuit, only the output of NAND 7 becomes "0" while the outputs of NAND 8, 9 and 10 are "1", so that the outputs of NAND 11, 12 and 13 are "0" and the output of NAND 14 is "1." On the other hand, since the output of the comparator 49 is "0," the outputs of NAND 15 to 18 are all "1" and therefore the output of NAND 19 returns to "0." The output "0" of NAND 11 turns the transistor $Q_4$ off so that the contacts S and $S_2$ of the delay 22 are closed to cause the rotation of the motor 23 to be changed over to the forward direction. This condition is quite the same as the initial condition at the start of operation. Under this condition, when the one-shot circuit 52 returns to the state "1," the transistor $Q_5$ is cut off to close the contacts P and $P_1$ of the relay 53. Consequently, the motor starts its forward rotation to increase the wavelength of the spectrophotometer again.

By repeating the above described operations, the time-dependent degrees of light absorption by the specimen with respect to the wavelengths preset by the variable resistors 39 to 42 are plotted on the X-Y recorder, as indicated by points #5, #6, . . . FIG. 9 is the time chart for illustrating such a repeated process as described above.

In the embodiment just above, the apparatus for repeatedly plotting dots with respect to four wavelengths is described, but an apparatus for repeatedly plotting dots with respect to any number of wavelengths more than four can also be provided without departing from the spirit and scope of the present invention.

As apparent from the foregoing descriptions, by the use of the apparatus for repeating the same process, according to the present invention, the drawback of short life that is inherent to the relay used for changing over the polarity of the power source in a bridge circuit can be eliminated so that the reliability is much improved. Moreover, the facility in operation is also improved since it is needless to set the position of the movable body (e.g. sliding contact of the variable resistor 6 in case of the spectrophotometer) within the range to be repeatedly covered. Further, it is possible to directly connect the apparatus with an X-Y recorder by using the voltage at the sliding contact of the variable resistor as the signal representing the position of the movable body. Although the present invention has been described in this specification as applied to the process for repeatedly covering different wavelengths in a spectrophotometer, it is self-evident that the present invention can be applied to any case where arbitrary physical quantities are repeatedly covered.

We claim:

1. An apparatus for repeating the same process, comprising a first and a second setting means for respectively setting a first and a second extreme point of a range, an electric motor, a movable body whose physical quantity is varied through the drive by said motor, means for generating another displacement quantity corresponding to said physical quantity, means for detecting whether said displacement quantity exists within said range defined by said first and second extreme points, means responsive to said detecting means for actuating said motor to shift said displacement quantity to move into said range upon the detection that said displacement quantity is out of said range, and a first control means responsive to said detecting means for controlling said motor upon the detection that said displacement quantity exists within said range so that said displacement quantity varies in a reciprocative manner between said first and second extreme points of said range.

2. An apparatus for repeating the same process, comprising a first and a second means for respectively setting a first and a second extreme point of a range, an electric motor, a movable body whose physical quantity is varied through the drive by said motor, means for generating another displacement quantity corresponding to said physical quantity, and a first control means for so controlling said motor that said displacement quantity varies in a reciprocative manner between said first and second extreme points of said range, wherein said first control means includes two comparing means for respectively comparing signals produced from said first and second setting means and representing said first and second extreme points with a signal produced from said displacement quantity generating means and representing said displacement quantity, a first gating means for delivering an output only when the levels of the outputs of said two comparing means become equal to each other, and a first relay means for controlling the direction of the rotation of said motor in accordance with the output of said first gating means.

3. An apparatus for repeating the same process, as claimed in claim 1, further comprising outlet terminals which are to be connected with a recorder for recording said displacement quantity.

4. An apparatus for repeating the same process, as claimed in claim 2, wherein first gating means produces an output when the respective levels of the outputs of said two comparing means become a certain positive value or become a certain negative value.

5. An apparatus for repeating the same process, comprising a first and a second setting means for respectively setting a first and a second extreme point of a range, an electric motor, a movable body whose physical quantity is varied through the drive by said motor, means for generating another displacement quantity corresponding to said physical quantity, and a first control means for so controlling said motor that said displacement quantity varies in a reciprocative manner between said first and second extreme points of said range, further comprising at least one additional setting means for setting an intermediate setting position between said two extreme positions and a second control means for temporarily stopping the drive by said motor when said displacement quantity corresponds to each of said first and second extreme points and said intermediate setting position during the travelling in a predetermined one direction in the reciprocal movement of said displacement quantity.

6. An apparatus for repeating the same process, as claimed in claim 5, wherein said second control means comprises a plurality of comparing means for respectively comparing signals produced from said additional setting means and said first and second setting means and representing said intermediate setting position and said first and second extreme points with a signal produced from said displacement quantity generating means and representing said displacement quantity, a second gating means for receiving the outputs of said plural comparing means and for delivering an output every time when said displacement quantity corresponds to each of said intermediate setting position and said first and second extreme points, and a second relay means for stopping the drive of said motor in accordance with the output of said second gating means.

7. An apparatus for repeating the same process, as claimed in claim 5, further comprising outlet terminals which are to be connected with a recorder for recording said displacement quantity.

8. An apparatus for repeating the same process, as claimed in claim 5, further comprising means for setting down a writing pen of said recorder only for the period during which said motor is temporarily stopped.

* * * * *